United States Patent
Zajak et al.

(10) Patent No.: US 9,631,657 B2
(45) Date of Patent: Apr. 25, 2017

(54) FASTENING ELEMENT AND ASSEMBLY WITH SUCH A FASTENING ELEMENT AND A RECEIVING ELEMENT

(71) Applicant: ITW FASTENER PRODUCTS GmbH, Iserlohn (DE)

(72) Inventors: Martin Zajak, Kaiserslautern (DE); Hubert Loewe, Weselberg (DE)

(73) Assignee: ITW FASTENER PRODUCTS GMBH, Iserlohn (DE)

( * ) Notice: Subject to any disclaimer, the term of this patent is extended or adjusted under 35 U.S.C. 154(b) by 9 days.

(21) Appl. No.: 14/874,503

(22) Filed: Oct. 5, 2015

(65) Prior Publication Data
US 2016/0108946 A1   Apr. 21, 2016

(30) Foreign Application Priority Data
Oct. 17, 2014   (DE) .................. 10 2014 115 186

(51) Int. Cl.
| F16B 19/00 | (2006.01) |
| F16B 13/04 | (2006.01) |
| F16B 13/12 | (2006.01) |
| F16B 19/10 | (2006.01) |
| F16B 21/08 | (2006.01) |

(52) U.S. Cl.
CPC .......... *F16B 13/045* (2013.01); *F16B 13/126* (2013.01); *F16B 19/00* (2013.01); *F16B 19/1081* (2013.01); *F16B 21/086* (2013.01)

(58) Field of Classification Search
CPC ...... F16B 13/045; F16B 13/126; F16B 19/00; F16B 19/1081; F16B 21/06; F16B 21/08; F16B 21/086

USPC ................................. 411/508–509
See application file for complete search history.

(56) References Cited

U.S. PATENT DOCUMENTS

| 3,320,712 A * | 5/1967 | Rapata .................. F16B 5/06 411/522 |
| 3,417,438 A * | 12/1968 | Schuplin ............. F16B 19/1081 248/73 |
| 3,921,496 A | 11/1975 | Helderman |
| 4,422,222 A * | 12/1983 | Notoya ................. F16B 5/0642 24/289 |
| 4,669,936 A * | 6/1987 | Camilleri ................ F16B 13/12 24/543 |
| 4,708,552 A * | 11/1987 | Bustos .................. F16B 13/126 248/231.91 |

(Continued)

FOREIGN PATENT DOCUMENTS

| DE | 19543651 | 7/1997 |
| DE | 102006007382 | 8/2007 |
| DE | 102013219797 | 4/2015 |

*Primary Examiner* — Roberta Delisle
(74) *Attorney, Agent, or Firm* — Joseph M. Butscher; The Small Patent Law Group, LLC

(57) ABSTRACT

A fastening element comprises a guide body which serves to be received in a receptacle, and at least one clamping tab which is arranged on the guide body and has art outer edge which is provided for cooperation with the inner surface of the receptacle. The outer edge of the clamping tab extends obliquely to a plane that is perpendicular to the central axis of the guide body, and the outer edge is in the form of a part of a thread such that thread effect is achieved with which the fastening element can be unscrewed from the receptacle.

20 Claims, 2 Drawing Sheets

(56) References Cited

U.S. PATENT DOCUMENTS

| | | | | |
|---|---|---|---|---|
| 4,716,633 | A * | 1/1988 | Rizo | B60R 13/0206 24/297 |
| 5,110,246 | A | 5/1992 | Fisher et al. | |
| 5,601,260 | A * | 2/1997 | Shinohara | F16B 21/088 248/68.1 |
| 5,632,584 | A * | 5/1997 | Acevedo | F16B 37/043 411/182 |
| 6,074,150 | A * | 6/2000 | Shinozaki | B60R 13/0206 24/297 |
| 6,196,756 | B1 * | 3/2001 | Leverger | B60J 3/023 403/326 |
| 8,950,043 | B2 | 2/2015 | Hofmann et al. | |
| 2005/0220560 | A1 | 10/2005 | Shinozaki et al. | |
| 2006/0174584 | A1 * | 8/2006 | Nakazato | B60N 3/026 52/834 |
| 2006/0198714 | A1 * | 9/2006 | Lesecq | F16B 19/1081 411/44 |
| 2008/0193250 | A1 * | 8/2008 | Boubtane | F16B 13/025 411/48 |
| 2008/0199272 | A1 * | 8/2008 | Limpert | B60R 13/0206 411/46 |
| 2009/0056087 | A1 * | 3/2009 | Arisaka | F16B 19/1081 24/455 |
| 2009/0263210 | A1 * | 10/2009 | Loewe | F16B 19/1081 411/553 |
| 2011/0116890 | A1 * | 5/2011 | Okada | F16B 5/0642 411/358 |
| 2011/0203081 | A1 * | 8/2011 | Iwahara | F16B 5/065 24/458 |
| 2012/0240363 | A1 * | 9/2012 | Lee | B60R 13/0206 24/297 |
| 2013/0097818 | A1 * | 4/2013 | Fukumoto | F16B 19/1081 24/305 |

* cited by examiner

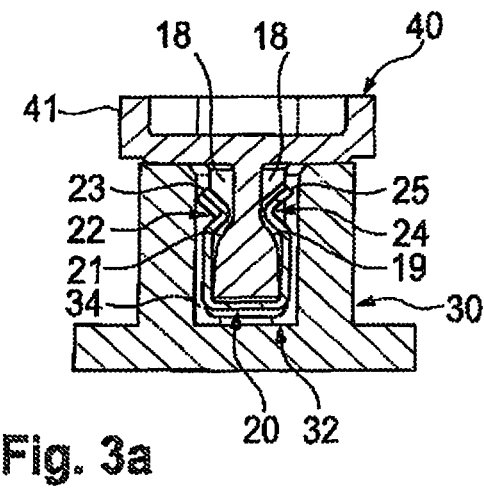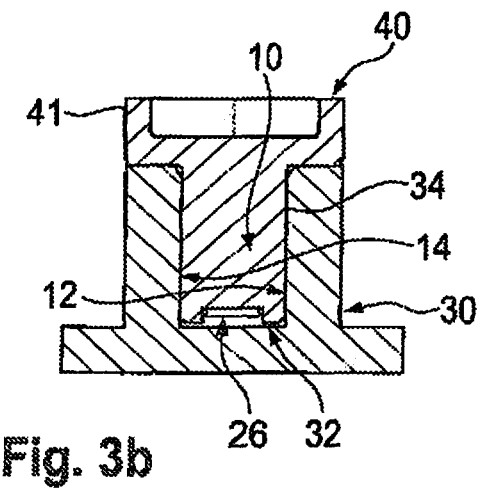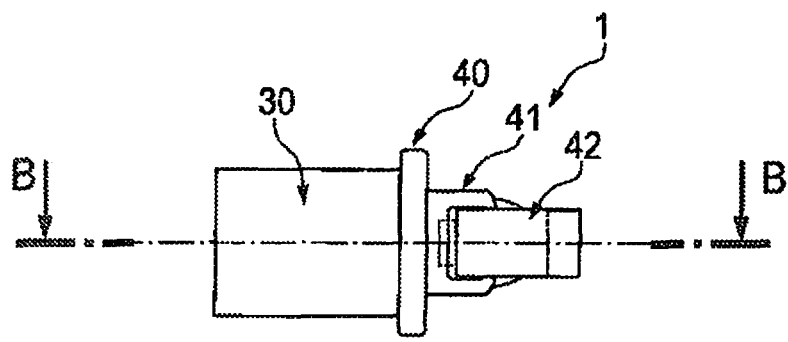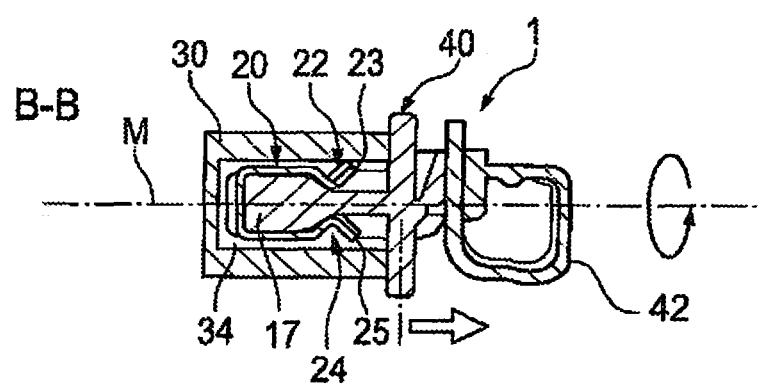

FASTENING ELEMENT AND ASSEMBLY WITH SUCH A FASTENING ELEMENT AND A RECEIVING ELEMENT

RELATED APPLICATION

This application claims priority from German Patent Application No. 10 2014 115 186.0, filed Oct. 17, 2014, the subject matter of which is incorporated herein by reference.

BACKGROUND OF THE INVENTION

The invention relates to a fastening element and to an assembly comprising such fastening element and a receiving element.

SUMMARY OF THE INVENTION

Frequently, various elements to be attached in a motor vehicle, such as lining parts, insulating elements or cables, are fastened to a carrier structure using fastening elements. These fastening elements may include a guide body, by which they are inserted into an opening of the carrier structure, and a clamping element which clamps the fastening element in place there upon insertion into the opening. The opening may be in the form of a blind hole, for example.

The clamping element has a self-enhancing clamping effect, so that when an attempt is made to dismount the fastening element by pulling the guide body out of the blind hole, the clamping force that counteracts the disassembly is further intensified. Either the fastening element can not be pulled out of the blind hole at all or it can be pulled out forcibly by applying great forces, with the inner surface of the blind hole being damaged by the clamping element in the process.

However, such damage to the inner surface of the blind hole will cause a deterioration of the clamping effect when it is intended to mount the same or a similar fastening element in the same blind hole again, in order to fasten, for example, a cable or lining part that is to be exchanged.

It is therefore the object of the invention to provide a fastening element which can be disassembled largely nondestructively and be assembled again.

BRIEF DESCRIPTION OF THE INVENTION

To achieve this object, the invention provides a fastening element which comprises a guide body adapted to be received in a receptacle. The fastening element further comprises at least one clamping tab which is arranged on the guide body and has an outer edge which is provided for cooperation with the inner surface of the receptacle. The outer edge of the clamping tab extends obliquely to a plane that is perpendicular to the central axis of the guide body. The outer edge is in the form of a part of a thread such that thread effect is achieved by means of which the fastening element can be unscrewed from the receptacle.

The invention is based en the concept of forming the clamping tab and in particular its outer edge as part of a virtual thread such that a displacement of the fastening element with respect to the receiving part is produced when these elements are rotated with respect to each other. In particular, by a rotation of the fastening element about the central axis, a force acting counter to the direction of insertion of the guide body can in this way be applied to the guide body through the clamping force exerted by the clamping tabs on the inner surface of the receptacle. The rotation about the central axis must be effected in that direction in which, due to its oblique position, the outer edge of the clamping tab produces a turn contrary to the direction of insertion of the guide body, and then results in the clamping tab and thus the fastening element being unscrewed from the receptacle.

This allows a nondestructive disassembly of the fastening element. The only consequence of the disassembly may be a thread that is possibly cut into the inner surface of the receptacle in the unscrewing process. But this does not present a problem when a fastening element is assembled again. In addition, owing to the transmission ratio of the thread formed by the clamping tab, the fastening element can be detached from the blind hole with a considerably lower amount of force required than is the case when known fastening elements are pulled out directly.

To make it easier to unscrew the fastening element from the receptacle, tool engagement surfaces are preferably provided on a connection part of the fastening element. Thus, a wrench or pliers may be applied, which further facilitates unscrewing the fastening element.

According to a preferred further development, a pair of clamping tabs are provided which are located diametrically opposite to each other with respect to the guide body. This prevents the guide body from jamming since the two clamping tabs ensure that the clamping forces that occur are symmetrical to each other. The two clamping tabs are preferably coordinated with each other regarding their oblique positions, i.e., seen along the periphery of the inner surface of the receptacle, the oblique positioning of the clamping tabs is of an identical orientation and, particularly preferably, features an essentially identical angular amount, in order that the force applied to the guide body by each clamping tab upon a rotation of the fastening element acts in the same direction along the central axis. In particular, both clamping tabs are positioned obliquely such that upon a rotation, that end of each outer edge which, due to the oblique positioning, is arranged at a lower level in the blind hole is arranged at the front in the sense of rotation. The rotation for disassembly is effected either clockwise or counterclockwise, depending on the particular embodiment.

According to a preferred further development, at least one, in particular each, clamping tab is flat and is oriented at such an angle that the outer edge is located at the rear of the guide body in the insertion direction, as a result of which the necessary rotational travel for dismounting the fastening element is minimized. Within the meaning of this further development, an outer edge is preferably arranged at the rear of the guide body when it is located within the receptacle no more than one third of the extent of the guide body in the assembled condition of the fastening element.

According to a preferred further development, at least one, in particular two, clamping tabs is/are part of a spring clip which is mounted to the guide body. Preferably, the spring clip has a U-shaped configuration and includes one clamping tab each at the free ends of its two legs, the clamping tabs projecting obliquely outwards. A simple solution thereby allows a sufficiently great clamping force to be applied to the clamping tab(s) by the spring clip being configured such that in a non-assembled condition of the fastening element, the clamping tabs are arranged at a distance from the central axis of the receptacle which is greater than the radius of the receptacle. In this way, when the guide body is introduced into the receptacle, the spring clip is radially compressed with respect to the central axis and is thus elastically deformed, as a result of which a spring force counteracting the elastic deformation is applied as a clamping force to the outer edges of the clamping tab(s) and is transmitted to the inner surface of the receptacle. The use of a separate component for the clamping tabs allows a suitable material to be used therefor, for example spring steel, whereas the guide body continues to be made from a plastic material for cost reasons.

Preferably, the spring clip is arranged in a clip receptacle which is defined by a middle web of the guide body and wall sections, arranged laterally thereof, of the guide body, which allows a simple mounting of the spring clip to the guide body and a simple joint mounting into the receptacle of the assembly produced in the process. In addition, such a configuration of the clip receptacle fixes the spring clip to the guide body contrary to the direction of insertion so as to at least substantially prevent relative rotation and in a substantially form-locking manner, as a result of which a transmission of rotary motions of the guide body to the spring clip and thus to the clamping tabs is ensured, just as is an unscrewing of the guide body along with the spring clip.

In order for a reliable preassembly of the spring clip to the guide body to take place, in a preferred further development the clip receptacle includes at least one expansion surface which can cooperate with the spring clip in the region of the two clamping tabs. In a still further preferred embodiment, the transition between the free ends of the two legs of the spring clip and the clamping tabs is configured so as to be contracted inwards here in order to allow a form-locking preassembly of the spring clip on the guide body. The expansion surface will also enhance the clamping effect when an attempt is made to pull the fastening element out of the blind hole since it will urge the clamping tab radially outwards and therefore against the inner surface of the blind hole.

In order to be able to use the fastening element for fastening various vehicle components such as, for example, lining parts, insulating parts or cables, to the carrier structure having a receptacle for the fastening element, in a preferred further development the fastening element has a connecting element which is preferably connected to the guide body and, particularly preferably, includes a cable tie, a clip mechanism and/or a bracket mechanism.

To achieve the above-mentioned object, according to the invention provision is also made for an assembly made up of a fastening element according to the invention and a receiving part, the receiving part being provided with a receptacle in which the guide body of the fastening element is arranged such that the outer edge of the clamping tab rests against the inner surface of the receptacle. This allows the fastening element to be unscrewed from the receptacle.

Preferably, the receiving pant is formed as a blind hole in a carrier structure. In particular of a motor vehicle. Such carrier structures may, for example, be chassis elements, main chassis beams or cross members, vehicle body parts or any other components of a motor vehicle to which attachable parts such as lining elements, insulating elements or cables are to be arranged.

According to a preferred further development of the assembly, the material of the clamping tab is harder than the material of the inner surface of the receptacle, at least in the region of the outer edge, as a result of which the reliability of a thread being formed in the inner surface of the receptacle is increased, which may result in the fastening element being simpler to unscrew from the receptacle. Preferably, each clamping tab and, particularly preferably, also the spring clip is configured with a metal material, in particular a spring steel.

Advantageous further configurations of the invention will be apparent from the dependent claims.

BRIEF DESCRIPTION OF THE DRAWINGS

Exemplary embodiments of the invention will become apparent from the descriptions below in conjunction with the Figures, which show, in detail and in an at least partly schematic form:

FIGS. 3a and 3b the assembled assembly from FIG. 2 in two sectional views offset at right angles to each other; and FIG. 4 a further assembly according to an embodiment of the invention with a cable tie in a top view and a sectional view.

DETAILED DESCRIPTION OF THE INVENTION

Figure 1:
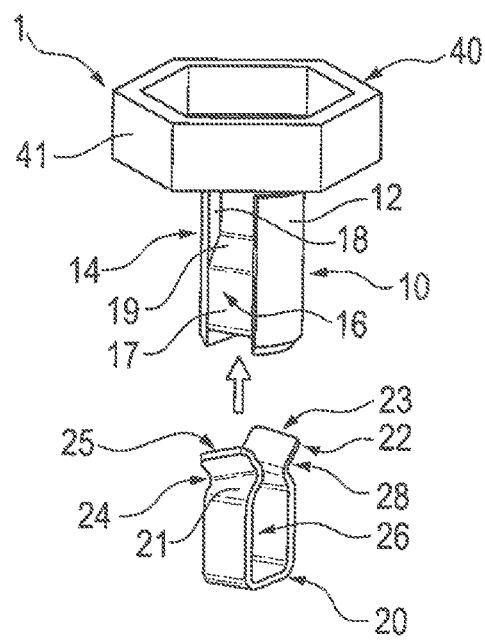
FIG. 1 the components of a fastening element according to an embodiment of the invention in a perspective view.

The Figures show an assembly which includes as its essential components a fastening element 1 and a receiving part 30. The receiving part 30 may be assumed to be stationary, for example to be firmly connected with a carrier, and the fastening element 1 may be inserted into the receiving part 30 (see FIG. 2), so that it is fastened therein.

Various parts that am to be fastened to the carrier may be fixed in place on the fastening element 1. Such parts may be cables that are to be fixed to the carrier by means of a cable holder 42 (see FIG. 4). The fastening element can be used to attach the most varied of components in particular in motor vehicles, for example lining parts, pipes, hoses, etc.

The fastening element 1 includes a guide body 10 which serves to be inserted into the receptacle 30. Integrally connected to the guide body 10 is a connecting part 40 which has on its outside a plurality of tool engagement surfaces 41 where a wrench, pliers or some other tool can be applied. The connecting part 40 has the cable tie 42 fitted to it, which is only shown in FIG. 4.

In the exemplary embodiment, the fastening element having the guide body 10 and the connecting part 40 is formed from a plastic material, for example in the form of a one-piece injection-molded part.

The guide body 10 has a first peripheral surface 12 and a second peripheral surface 14, which are arranged diametrically on an identical radius with respect to the central axis M. In addition, the guide body 10 is configured with a clip receptacle 16 which serves to hold a spring clip 20.

The dip receptacle 16 includes a middle web 17 forming its bottom and wall sections 18 forming its lateral delimitation.

The middle web 17 has a varying wall thickness along its extent. Its wall thickness is largest at the free front end of the guide body 10. A pair of expansion surfaces 19 are provided roughly in the area of the middle of the guide body and extend obliquely towards each other, so that the wall thickness of the middle web 17 is reduced there. In the remaining portion towards the connecting pad 40, the wall thickness is constant, at a value that is reduced compared to the front portion. The profile of the wall thickness can be best seen in FIG. 3a.

The spring clip 20 (see in particular FIGS. 1 and 3a) is made of spring steel and has a generally U-shaped form.

Towards the free ends, each leg of the U-shaped spring clip 20 is provided with a section 21 bent inwards so that, compared with the inner portion arranged closer to the bottom, a constriction or narrowed portion 28 is formed.

Arranged at the free end of each section 21 is a clamping tab 22 which extends obliquely outwards and away from the bottom of the spring dip 22. The free end of each clamping tab 22 defines a clamping edge 23 which is located further outside than the legs of the U of the spring clip 20.

In addition to their oblique position relative to a radially extending plane, the clamping tabs 22 are also applied obliquely relative to a peripheral direction. This can be clearly seen in FIGS. 11 and 3a. One of the ends of each clamping edge 23 is arranged closer to the bottom of the U-shaped spring clip 20 than the other end. Thus, each clamping edge runs with a pitch, similar to a thread pitch, in relation to the central axis of the fastening element 1.

The spring clip 20 is mounted to the guide body 10 such that it is positioned within the clamp receptacle 16. To this end, it is inserted in the clamp receptacle 16 in the direction of the arrow of FIG. 1. The clamping tabs 22 serve as an insertion slope here, so that the spring clip 20 is first widened. As soon as the constriction or narrowed portion 28 has slipped over the first section of the middle web, which has the greatest wall thickness, the sections 21 of the spring clip 20 will elastically snap in "behind" the expansion surfaces 19 (see the state shown in FIG. 3), so that the spring clip is held on the middle web 17.

In the preassembled state of the fastening element 1, the outer edges 23 and 25 of the first and second clamping tabs 22 and 24 are radially at a greater distance from the central axis M than the peripheral surfaces 12 and 14 of the guide body and also have a greater distance from the central axis M than the inner surface 34 of the receptacle 32.

The receiving part 30 includes a receptacle 32 which is in the form of a cylindrical opening or blind hole here and has an inner surface 34. Basically, a passage opening may also be used.

What is important is that the dimensions of the inner surface, in particular its inside diameter, and the distance of the clamping edges 23 from each other are selected such that in the initial condition, the clamping edges have a distance from each other which is slightly greater than the inside diameter of the inner surface 34.

Figure 2:
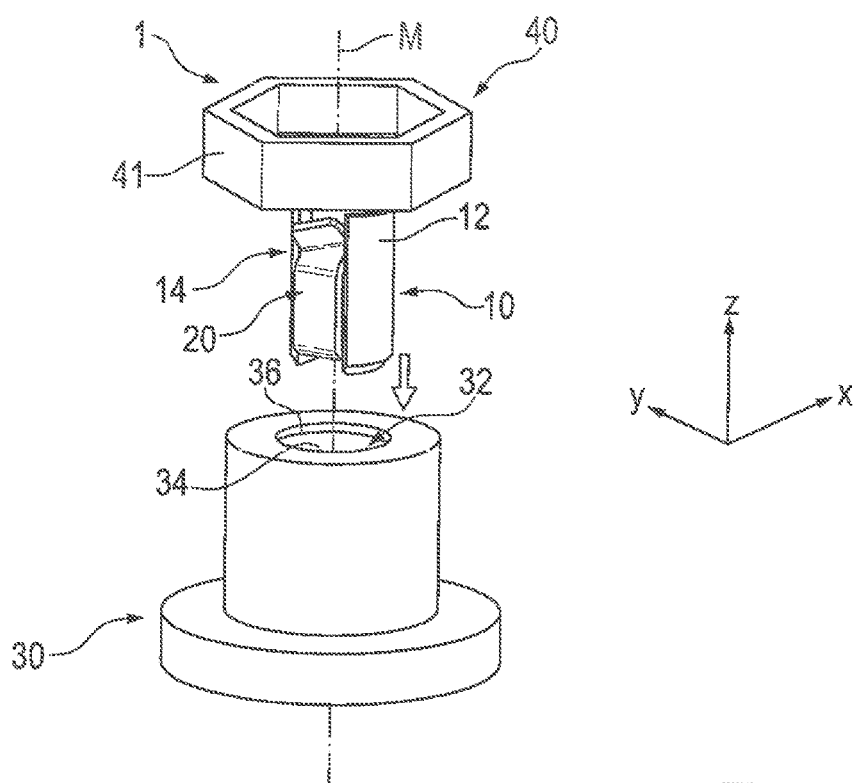
FIG. 2 an assembly according to an embodiment of the invention with the preassembled components of the fastening element from FIG. 1 and a receiving part in a perspective view.

To fasten the fastening element 1 in the receiving part 30, the fastening element 1 is inserted into the receptacle 32 in the direction of the arrow pointing down in FIG. 2. In the process, the first and second clamping tabs 22 and 24 of the spring clip 20 are elastically deformed towards the central axis M in order to be able to be received in the receptacle 32. As a result of this elastic deformation, the outer edges 23 and 25 of the clamping tabs 22 and 24 steadily apply a radial force that is proportional to the deformation to the inner surface 34 of the receptacle 32.

At the beginning of the assembly process, the guide body 10 may be aligned with the receiving part 30 to a common central axis M by aligning its terminal chamfer with the chamfer 36 of the receptacle 32. During the further assembly process, the insertion movement is guided by a cooperation of the peripheral surfaces 12 and 14 with the inner surface 34 of the receptacle 32, until the guide body 10 has been inserted into the receptacle 32 up to a stop on the connection element 40.

FIGS. 3a and 3b show the assembled assembly 100 from FIG. 2 in two sectional views offset at right angles to each other, with FIG. 3a illustrating a section taken through an x-z plane according to the coordinate system drawn into FIG. 2 and running through the central axis M, and FIG. 3b illustrating a section taken through a y-z plane in this coordinate system and running through the central axis M.

It is apparent in particular from FIG. 3a that the spring clip 20 is connected in a form-fitting manner towards the top with the middle web 17 of the clip receptacle 16 and laterally rests against the wall sections 13 of the clip receptacle 16.

In the state shown in FIGS. 3a and 3b, the fastening element 1 can not be pulled out of the receiving part 30 in the axial direction. An axial tensile force is transmitted to the spring clip 20 and, more precisely, to the clamping tabs 22 via the expansion surfaces 19. The oblique position of the clamping tabs 22 causes them to spread by the clamping edges 23 into the inner wall 34 of the receptacle 32, so that the clamping tabs become wedged there and in this way hold the fastening element 1 within the receptacle 32.

When it is intended to remove the fastening element 1 from the receptacle 32, a rotary motion is imparted to the fastening element via the connection part 40. This rotary motion will be transmitted to the spring clip 20 via the wall sections 18 of the guide body 10. Owing to the oblique orientation of the clamping edges 23, similar to a thread pitch, this results in that the clamping edges 23 cut obliquely into the inner surface 34 of the receptacle 32 and in this way "unscrew" the fastening element 1 from the receptacle 32, that is, upon a rotation they produce a lifting, which ultimately results in that the fastening element 1 is dismounted from the receiving part 30.

In the exemplary embodiment described, such a rotary motion needs to be effected counterclockwise for an unscrewing to be obtained, contrary to the direction of insertion of the guide body 10 into the receptacle 32. As soon as the outer edges 23 and 25 have been unscrewed from the receptacle 32, depending on the mounting position of the clamping tabs 22 and 24, the thread pitch and the angle of rotation, the entire fastening element 1 can be removed from the receptacle 32, possibly with a small frictional resistance of the peripheral surfaces 12 and 14, on the one hand, and the inner surface 34, en the other hand. This is effected without a destruction of the inner surface 34 of the receptacle 32, possibly except for the locally cut in thread turns which are not detrimental to a renewed assembly.

It is apparent in particular from FIG. 3b how the peripheral surfaces 12 and 14 rest against the inner surface 34 of the receptacle 32 in the assembled state. The upwardly form-locking connection of the U shaped portion 28 of the spring clip 20 with the guide body 10 (at the middle web 17 thereof) is also well visible here.

FIG. 4 shows a further assembly 100 according to an embodiment of the invention with a closed cable tie 42 in a top view and a sectional view B-B drawn into the top view.

The cable tie 42 is integrally connected with the connection part 40 and the guide body 10. As is indicated in the sectional view B-B by the arrows about the central axis and to the right in the illustration, the fastening element can be rotated counterclockwise on the cable tie or on tool engagement surfaces not drawn in here, as a result of which the fastening element 1 is unscrewed from the receiving part 30 by the engagement of the outer edges 23 and 25 with the inner surface 34 of the receptacle 32.

Any unintentional rotation of the fastening element 1 within the receptacle 32 in the assembled condition is prevented by the components which are received in the cable tie 42 or a similar assembly part since these components provide for the fixing of the fastening element 1 in the peripheral direction.

The invention claimed is:

1. A fastening element comprising a guide body which serves to be received in a receptacle, and comprising at least one clamping tab which is arranged on the guide body and has an outer edge which is provided for cooperation with an inner surface of the receptacle, wherein the outer edge of the clamping tab extends obliquely to a plane which is perpendicular to a central axis of the guide body and wherein the outer edge is in the form of a part of a thread such that a thread effect is achieved by means of which the fastening element can be unscrewed from the receptacle, wherein the at least one clamping tab is part of a spring clip which is mounted to the guide body, wherein the spring clip is arranged in a clip receptacle which is defined by a middle web of the guide body and wall sections, arranged laterally thereof, of the guide body.

2. The fastening element of claim 1, wherein a pair of clamping tabs are provided which are located diametrically opposite to each other with respect to the guide body.

3. The fastening element of claim 2, wherein the spring clip has a U-shaped configuration with two legs, and includes one of said pair of clamping tabs at each of a free end of each of the legs, the pair of clamping tabs projecting obliquely outwards.

4. The fastening element of claim 3, wherein a transition between the free ends of the two legs of the spring clip and the said clamping tabs is configured so as to be contracted inwards.

5. The fastening element of claim 1, wherein the at least one clamping tab is flat and is oriented at such an angle that the outer edge is located at a rear of the guide body when viewed in an insertion direction.

6. The fastening element of claim 1, wherein the clip receptacle includes at least one expansion surface which can cooperate with the spring clip in a region of the at least one clamping tab.

7. The fastening element of claim 3, wherein connected to the guide body is a connecting element which includes one of a cable tie, a clip mechanism and a bracket mechanism.

8. An assembly comprising the fastening element of claim 1 and a receiving part which is provided with a receptacle in which the guide body of the fastening element is arranged such that the outer edge of the at least one clamping tab rests against an inner surface of the receptacle.

9. The assembly of claim 8, wherein at least in a region of the outer edge, the material of the clamping tab is harder than the material of the inner surface of the receptacle.

10. An assembly comprising the fastening element of claim 1 and a receiving part having a receptacle in which the guide body of the fastening element is arranged such that the outer edge of the at least one clamping tab rests against an inner surface of the receptacle.

11. The assembly of claim 10, wherein at least in a region of the outer edge, the material of the clamping tab is harder than the material of the inner surface of the receptacle.

12. A fastening element comprising:
 a guide body that is configured to be received in a receptacle, wherein the guide body includes a middle web, lateral wall sections, and a clip receptacle defined by the middle web and the lateral wall sections; and
 a spring clip mounted to the guide body, wherein the spring clip includes at least one clamping tab having an outer edge that is configured to cooperate with an inner surface of the receptacle, wherein the spring clip is arranged in the clip receptacle defined by the middle web and the lateral wall sections.

13. The fastening element of claim 12, wherein the outer edge of the at least one clamping tab extends obliquely to a plane which is perpendicular to a central axis of the guide body, and wherein the outer edge includes a thread portion that is configured to allow the fastening element to be unscrewed from the receptacle.

14. The fastening element of claim 12, wherein the at least one clamping tab comprises a first clamping tab located diametrically opposite from a second clamping tab with respect to the guide body.

15. The fastening element of claim 14, wherein the spring clip further comprises a U-shaped portion with two legs, wherein one of the first and second clamping tabs is at each of a free end of each of the legs, and wherein the first and second clamping tabs project obliquely outwards.

16. The fastening element of claim 15, wherein a transition between the free ends of the two legs of the spring clip and the first and second clamping tabs inwardly contracts.

17. The fastening element of claim 12 wherein the at least one clamping tab is flat and is oriented at an angle.

18. The fastening element of claim 12, wherein the clip receptacle comprises at least one expansion surface that is configured to cooperate with the spring clip in a region of the at least one clamping tab.

19. The fastening element of claim 12, further comprising a connecting element coupled to the guide body, wherein the connecting element includes one of a cable tie, a clip mechanism and a bracket mechanism.

20. A fastening element comprising:
 a guide body that is configured to be received in a receptacle, wherein the guide body includes a middle web, lateral wall sections, and a clip receptacle defined by the middle web and the lateral wall sections; and
 a spring clip mounted to the guide body, wherein the spring clip includes a first clamping tab and a second clamping tab, and a U-shaped portion with two legs, wherein one of the first and second clamping tabs is at each of a free end of each of the legs, wherein the first and second clamping tabs project obliquely outwards, wherein each of the first clamping tab and the second clamping tab has an outer edge that is configured to cooperate with an inner surface of the receptacle, wherein the outer edge extends obliquely to a plane which is perpendicular to a central axis of the guide body, wherein the outer edge includes a thread portion that is configured to allow the fastening element to be unscrewed from the receptacle, wherein the spring clip is arranged in the clip receptacle defined by the middle web and the lateral wall sections, and wherein a transition between the free ends of the two legs of the spring clip and the first and second clamping tabs inwardly contracts.

* * * * *